(12) United States Patent
Chakraborty et al.

(10) Patent No.: US 9,462,562 B2
(45) Date of Patent: Oct. 4, 2016

(54) METHODS AND APPARATUSES FOR USER EQUIPMENT ASSISTED TIME AND FREQUENCY SYNCHRONIZATION OF SMALL CELLS

(71) Applicant: QUALCOMM Incorporated, San Diego, CA (US)

(72) Inventors: Kaushik Chakraborty, San Diego, CA (US); Soumya Das, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/042,523

(22) Filed: Sep. 30, 2013

(65) Prior Publication Data

US 2015/0092738 A1   Apr. 2, 2015

(51) Int. Cl.
*H04W 56/00* (2009.01)
*H04L 5/00* (2006.01)
*H04W 72/04* (2009.01)
*H04W 88/02* (2009.01)

(52) U.S. Cl.
CPC .......... *H04W 56/001* (2013.01); *H04L 5/0005* (2013.01); *H04W 56/0035* (2013.01); *H04W 72/0413* (2013.01); *H04W 88/02* (2013.01)

(58) Field of Classification Search
CPC ......... H04W 56/001; H04W 72/0413; H04W 88/02; H04W 56/0035; H04L 5/0005
USPC .................. 370/330, 331, 336; 455/436, 438
See application file for complete search history.

(56) References Cited

U.S. PATENT DOCUMENTS

| 8,385,836 | B2 | 2/2013 | Whinnett |
| 2009/0135790 | A1 | 5/2009 | Yavuz et al. |
| 2009/0290555 | A1* | 11/2009 | Alpert et al. ................. 370/331 |
| 2011/0092231 | A1 | 4/2011 | Yoo et al. |
| 2011/0223903 | A1 | 9/2011 | Michel et al. |
| 2011/0235609 | A1* | 9/2011 | Ahn et al. ..................... 370/329 |
| 2011/0306340 | A1 | 12/2011 | Lindoff et al. |
| 2013/0244653 | A1 | 9/2013 | Song et al. |
| 2013/0260766 | A1* | 10/2013 | Lee et al. ...................... 455/436 |
| 2015/0016419 | A1* | 1/2015 | Kim ...................... H04W 36/04 370/331 |

FOREIGN PATENT DOCUMENTS

| WO | 2009070618 | 6/2009 |
| WO | WO-2011063044 A1 | 5/2011 |
| WO | WO-2011109466 A1 | 9/2011 |

OTHER PUBLICATIONS

International Search Report and Written Opinion—PCT/US2014/058044—ISA/EPO—Nov. 28, 2014.

* cited by examiner

*Primary Examiner* — Ricky Ngo
*Assistant Examiner* — Richard Chang
(74) *Attorney, Agent, or Firm* — Loza & Loza LLP

(57) ABSTRACT

Aspects of the present disclosure provide a user equipment (UE) assisted synchronization method in which a small cell can request and obtain time and frequency offset information from one or more UEs currently associated with the small cell, and the small cell can discipline its clock drift accordingly.

68 Claims, 13 Drawing Sheets

METHODS AND APPARATUSES FOR USER EQUIPMENT ASSISTED TIME AND FREQUENCY SYNCHRONIZATION OF SMALL CELLS

TECHNICAL FIELD

Aspects of the present disclosure relate generally to wireless communication systems, and more particularly, to time and frequency synchronization of small cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. In various aspects of the present disclosure, these improvements should be applicable to other multi-access technologies and the telecommunication standards that employ these technologies.

Within modern cellular telecommunications systems, heterogeneous networks are recently gaining significant attention. In a heterogeneous network, base stations of different sizes and power levels operate together to provide more complete coverage, particularly in urban areas where the signal from high-power base stations, frequently called macrocells, fails to reach certain areas such as indoors. Thus, heterogeneous networks may include one or more types of low-power base stations, which are frequently called microcells, picocells, and femtocells to improve coverage in the indoor locations.

In particular, femtocells utilize existing infrastructure deployed for Internet communication as a network backhaul for wired communication with the cellular network. In this way, for example, a user may deploy a femtocell in an indoor location where improved cellular coverage is desired by connecting a femtocell to the Internet through a cable or DSL modem.

LTE can support both asynchronous and synchronous configurations. When LTE is deployed in a synchronous configuration, time and frequency synchronization is critical for femtocell (called a Home eNode B or HeNB in LTE standards) operation. Typically, a femtocell can derive its clock time from the network backhaul (e.g., Network Time Protocol (NTP), Precision Time Protocol (PTP), or other variants), from a "network listen" circuit (e.g., an RF circuit that can receive and interpret information from the air channel, transmitted from nearby macrocells), and/or by utilizing GPS-based methods.

However, meeting synchronization requirements is especially challenging for femtocells. Femtocells are generally low cost, unplanned deployments in indoor environments with limited operator control. Additionally, there may be loose coordination with macrocells and unreliable backhaul connectivity. Typically, femtocells use a low cost or poor quality oscillator that requires frequent time or frequency offset corrections. Furthermore, reception quality of GPS and macrocell signals can change significantly based on femtocell placement and location, and backhaul based synchronization may not meet time accuracy requirements.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communications operable at a network node. The network node transmits a synchronization capability request to a user equipment (UE) associated with the network node. The network node receives a synchronization capability response from the UE as a response to the synchronization capability request. The network node receives synchronization information of at least one target cell from the UE. The network node synchronizes time and frequency of the network node with that of the at least one target cell based on the received synchronization information.

Another aspect of the disclosure provides a method of wireless communications operable at a user equipment (UE). The UE receives a synchronization capability request from a network node serving the UE. The UE transmits a synchronization capability response to the network node as a response to the synchronization capability request. The UE obtains synchronization information of at least one target cell. The UE transmits the synchronization information to the network node.

Another aspect of the disclosure provides a network node. The network node includes: means for transmitting a synchronization capability request to a user equipment (UE) associated with the network node; means for receiving a synchronization capability response from the UE as a response to the synchronization capability request; means for receiving synchronization information of at least one target cell from the UE; and means for synchronizing time and frequency of the network node with that of the at least one target cell based on the received synchronization information.

Another aspect of the disclosure provides a user equipment (UE). The UE includes: means for receiving a synchronization capability request from a network node serving the UE; means for transmitting a synchronization capability response to the network node as a response to the synchronization capability request; means for obtaining synchronization information of at least one target cell; and means for transmitting the synchronization information to the network node.

Another aspect of the disclosure provides a computer program product including a computer-readable storage medium. The computer-readable storage medium includes code for causing a network node to: transmit a synchronization capability request to a user equipment (UE) associated with the network node; receive a synchronization capability response from the UE as a response to the synchronization capability request; receive synchronization information of at least one target cell from the UE; and synchronize time and frequency of the network node with that of the at least one target cell based on the received synchronization information.

Another aspect of the disclosure provides a computer program product including a computer-readable storage medium. The computer-readable storage medium includes code for causing a user equipment (UE) to: receive a synchronization capability request from a network node serving the UE; transmit a synchronization capability response to the network node as a response to the synchronization capability request; obtain synchronization information of at least one target cell; and transmit the synchronization information to the network node.

Another aspect of the disclosure provides a network node that includes: at least one processor; a communication interface coupled to the at least one processor; and a memory coupled to the at least one processor the at least one processor is configured to: transmit a synchronization capability request to a user equipment (UE) associated with the network node; receive a synchronization capability response from the UE as a response to the synchronization capability request; receive synchronization information of at least one target cell from the UE; and synchronize time and frequency of the network node with that of the at least one target cell based on the received synchronization information.

Another aspect of the disclosure provides a user equipment (UE) that includes: at least one processor; a communication interface coupled to the at least one processor; and a memory coupled to the at least one processor. The at least one processor is configured to: receive a synchronization capability request from a network node serving the UE; transmit a synchronization capability response to the network node as a response to the synchronization capability request; obtain synchronization information of at least one target cell; and transmit the synchronization information to the network node.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
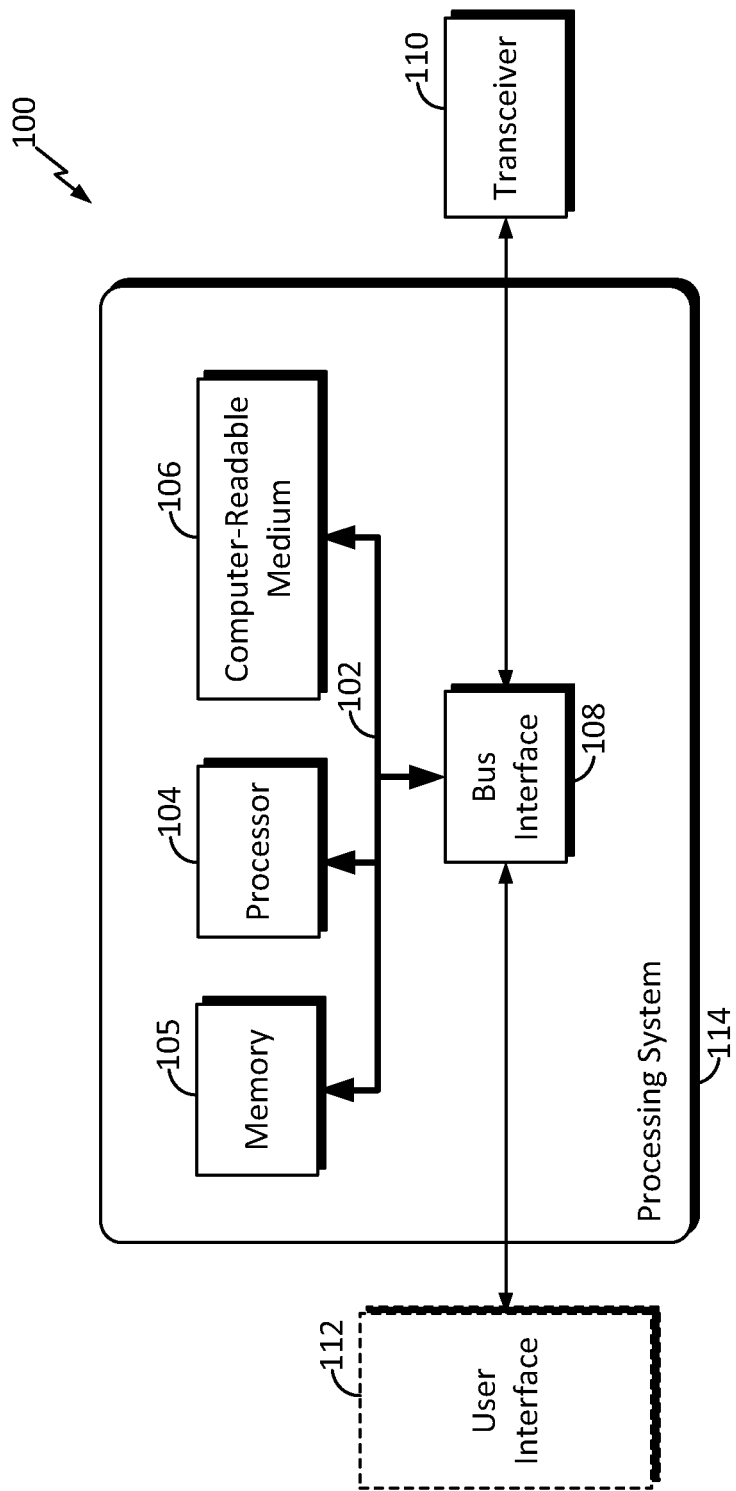
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide a user equipment (UE) assisted synchronization method in which a small cell can request and obtain time and frequency offset information from one or more UEs currently associated with the small cell, and the small cell can discipline its clock drift accordingly. The small cell may be any suitable low-power cell, including but not limited to a femtocell, a picocell, or a metrocell, the details of each of which are known to those of ordinary skill in the art, and are accordingly not provided in detail herein. By way of example and not limitation, the small cell may be a femtocell that can instruct the UE(s) associated with it to measure and report time and frequency offsets with neighboring macrocell(s). In an aspect of the disclosure, the time offset can be directly inferred or determined from UE measurement reports. The frequency offset may be derived from periodic time offset measurements either at the UE or the femtocell. However, the time offset measurements need not be periodic. Frequency offset can also be derived from multiple time offset measurements as long as the time interval between successive such measurements are known.

In the present disclosure, LTE femtocells are illustrated as example, and suggested modifications and enhancements to existing LTE standard are disclosed for enabling this feature. However, it should be appreciated that the disclosed technique may be applied to other synchronous wireless networks.

By way of example and without limitation, existing LTE standards such as Reference Signal Time Difference (RSTD) measurements in LTE Positioning Protocol (LPP) can be adapted for the purpose of achieving time and frequency synchronization at a femtocell (hereafter referred to as the HeNB). However, it should be noted that the RSTD-based framework can be completed avoided in various aspects of the disclosure. That is, in some aspects of the disclosure, no involvement of LPP and core network entities is needed. The UE can perform Observed Time Difference Of Arrival (OTDOA) type measurements similar to RSTD and report a time offset between a reference HeNB (e.g., a serving HeNB) and a target neighbor eNB (e.g., a macrocell) at the behest of the HeNB. The UE can optionally compute and report frequency offsets from multiple time offsets measurements. Alternatively, frequency offset computations can be done at the HeNB side. In various aspects of the disclosure, a UE can determine the time offset by measuring the relative time differences for downlink reference signals received from the reference HeNB and neighboring target eNB(s).

The following are examples of some changes that may be made to the LTE standard to practice the various aspects of the disclosure. The HeNB side can request and process relevant measurement reports from the UE. The UE may distinguish HeNB originated measurement requests from current 3GPP standard-compliant LPP measurement requests. If desired, the UE can compute and report frequency error or offset estimates to the HeNB side. The UE measurements can be enhanced from Positioning Reference Signal (PRS) based measurements for RSTD to any reference signal-based measurement for time offset estimation.

Aspects of the disclosure provide new UE-assisted synchronization capability (hereafter "SYNCH") that is determined through new handshaking signaling between a HeNB and the UE, and new information elements (IEs) and call flows are proposed for both intra- and inter-frequency UE measurements.

Processing System

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, a UE or a femtocell may be implemented with the apparatus 100. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
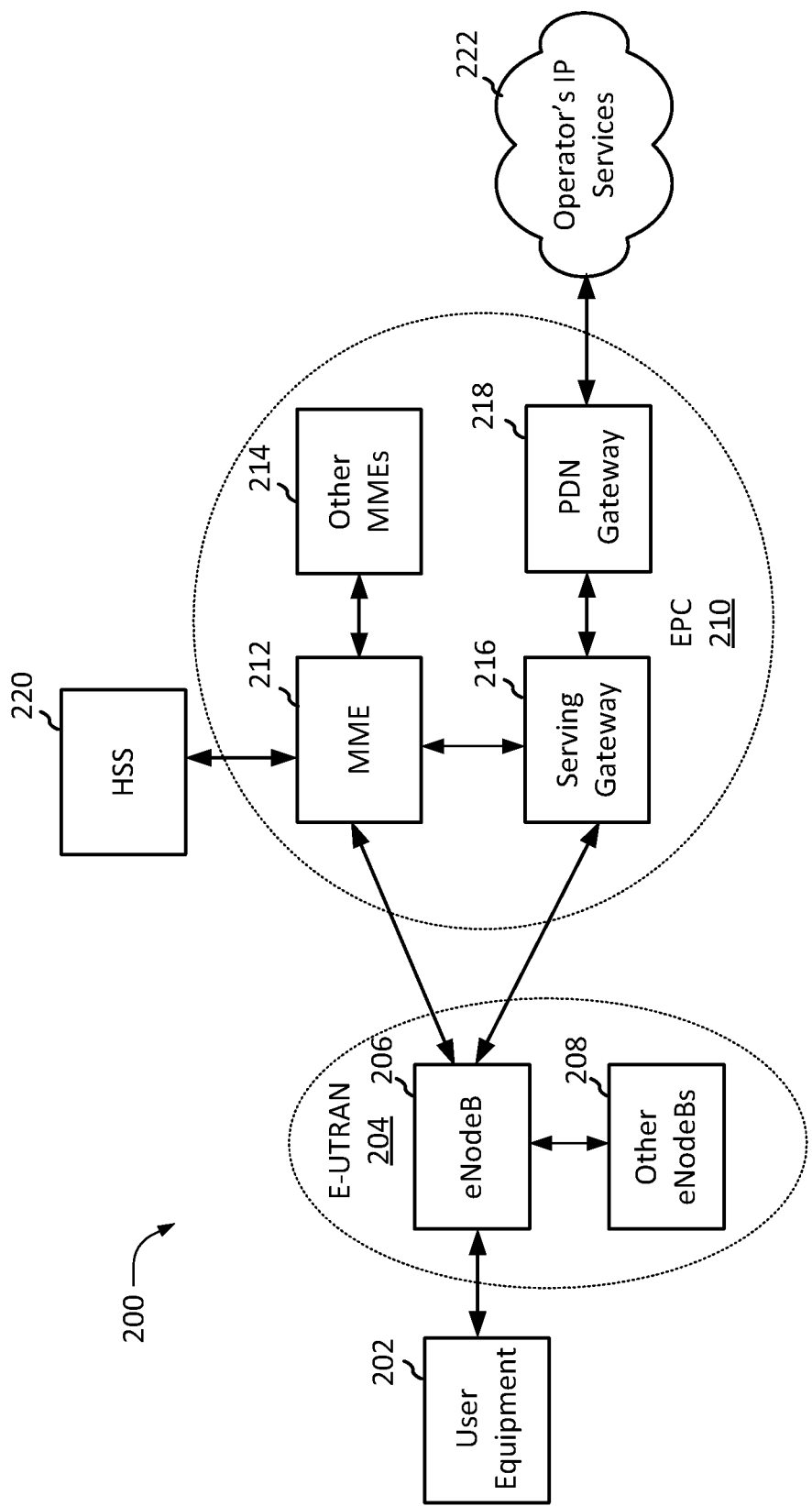
FIG. 2 is a diagram illustrating a Long Term Evolution (LTE) network architecture employing various apparatuses.

The various concepts presented throughout this disclosure may be implemented across a broad variety of telecommunication systems, network architectures, and communication standards. FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a tablet, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Access Network

Figure 3:
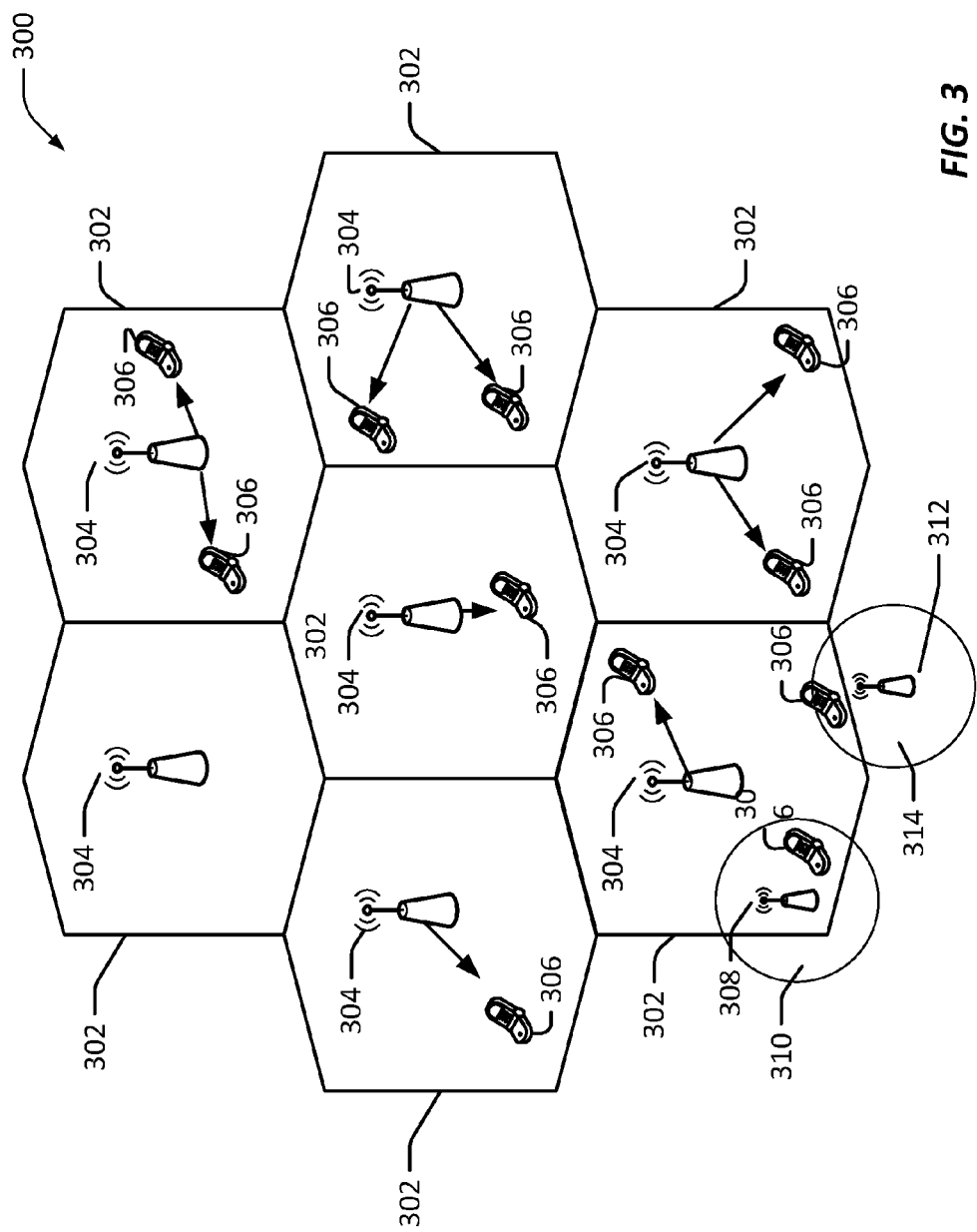
FIG. 3 is a diagram illustrating an example of an access network in an LTE network architecture.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femtocells (e.g., home eNBs (HeNBs)), pico cells, or micro cells. A higher power class or macro eNB 304 is assigned to a cell 302 (e.g., macro cell) and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
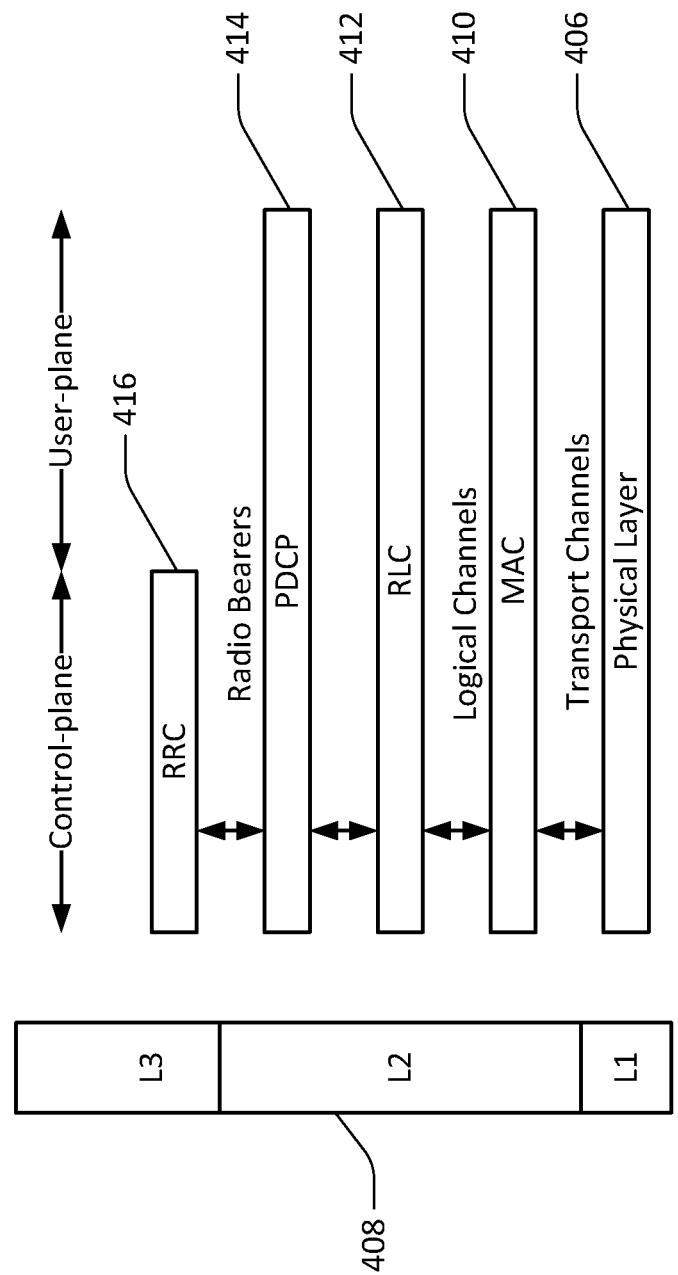
FIG. 4 is a conceptual diagram illustrating an example of a radio protocol architecture for the user and control planes for an LTE network.

The radio protocol architecture may take on various forms depending on the particular application. An example for an LTE system will now be presented with reference to FIG. 4. FIG. 4 is a conceptual diagram illustrating an example of the radio protocol architecture for the user and control planes.

Turning to FIG. 4, the radio protocol architecture for a UE 202 and an eNB 206 is shown with three layers: Layer 1, Layer 2, and Layer 3. Layer 1 is the lowest layer and implements various physical layer signal processing functions. Layer 1 will be referred to herein as the physical layer 406. Layer 2 (L2 layer) 408 is above the physical layer 406 and is responsible for the link between the UE and eNB over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that is terminated at the PDN gateway 218 (see FIG. 2) on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3. The RRC sublayer 416 is responsible for obtaining radio resources (i.e., radio bearers) and for configuring the lower layers using RRC signaling between the eNB and the UE.

Figure 5:
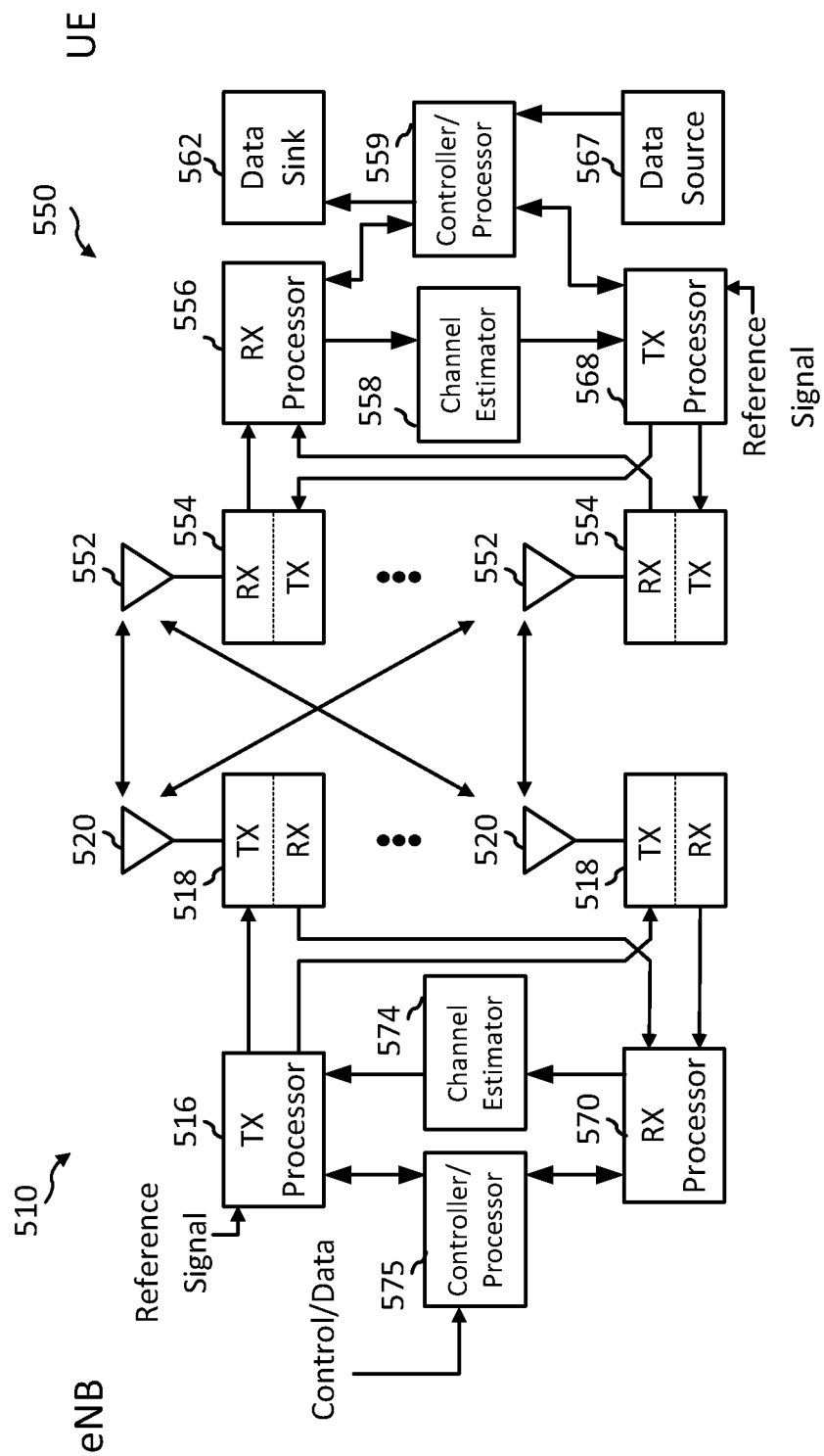
FIG. 5 is a block diagram illustrating a Home eNB (HeNB) in communication with a user equipment (UE) in an access network.

FIG. 5 is a block diagram of an eNB 510 in communication with a UE 550 in an access network. In the DL, upper layer packets from the core network are provided to a controller/processor 575. The controller/processor 775 implements the functionality of the L2 layer described earlier in connection with FIG. 4. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The TX processor 516 implements various signal processing functions for the L1 layer (i.e., physical layer). The signal processing functions include coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. Each receiver 554RX recovers information modulated onto an RF carrier and provides the information to the receiver (RX) processor 556.

The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer described earlier in connection with FIG. 4. In the UL, the control/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer (L2). Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. 5 The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 implements the L1 layer.

The controller/processor 559 implements the L2 layer described earlier in connection with FIG. 4. In the UL, the control/processor 559 provides demultiplexing between transport and logical channels, packet reassembly, deciphering, header decompression, control signal processing to recover upper layer packets from the UE 550. Upper layer packets from the controller/processor 559 may be provided to the core network. The controller/processor 559 is also responsible for error detection using an ACK and/or NACK protocol to support HARQ operations.

In an aspect of the disclosure, the processing system 114 described in relation to FIG. 1 may be used to implement the eNB 510. For example, the processing system 114 includes the TX processor 516, the RX processor 570, and the controller/processor 575. In another aspect of the disclosure, the processing system 114 described in relation to FIG. 1 may be used to implement the UE 550. For example, the processing system 114 includes the TX processor 568, the RX processor 556, and the controller/processor 559.

Figure 6:
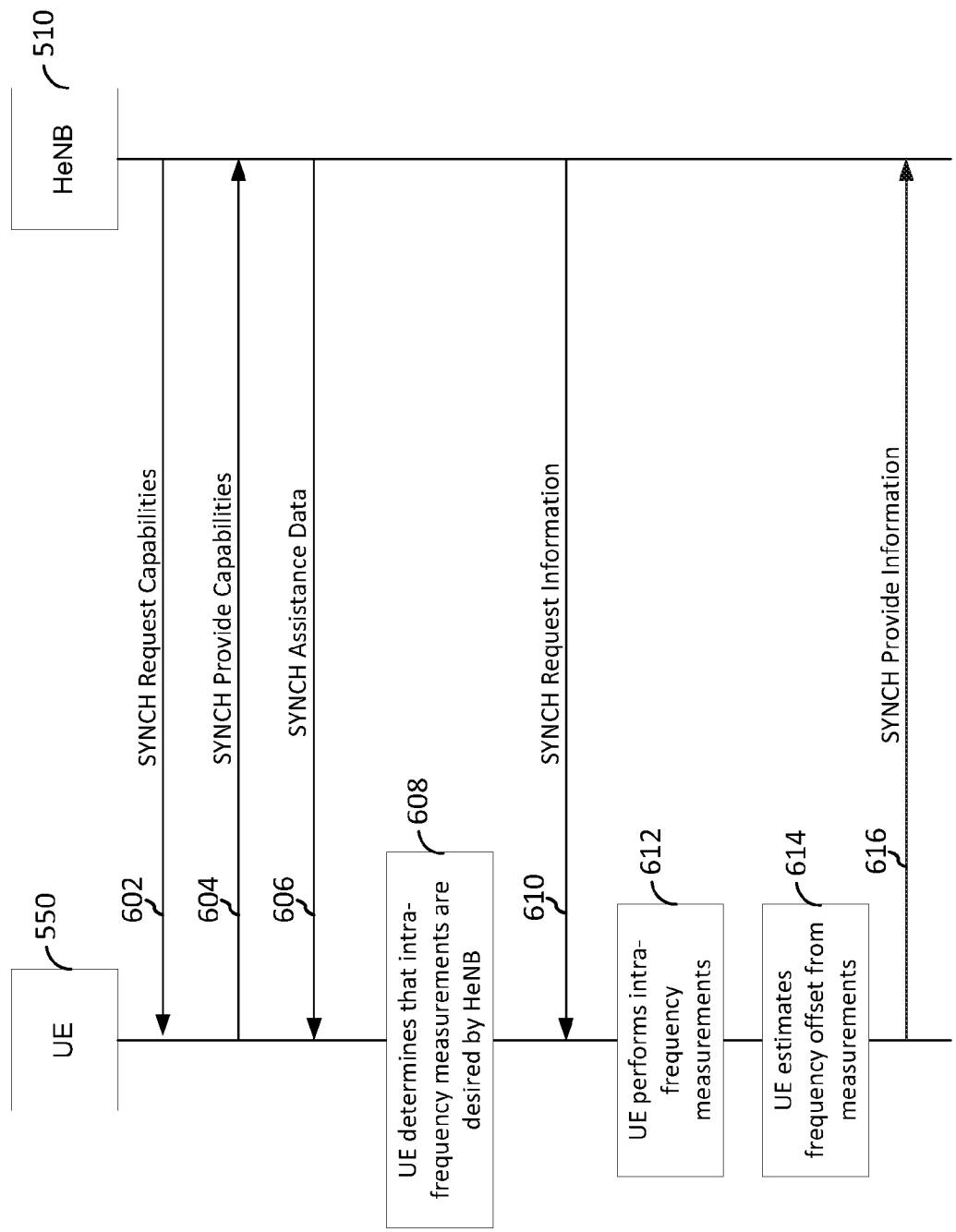
FIG. 6 is a call flow diagram illustrating time and frequency synchronization of a HeNB utilizing intra-frequency UE measurements in accordance with an aspect of the disclosure.

FIG. 6 is a call flow diagram illustrating time and frequency synchronization of a HeNB utilizing intra-frequency UE measurements in accordance with an aspect of the disclosure. A HeNB 510 sends a time and frequency synchronization (SYNCH) Request Capabilities information element 602 to a UE 550 to request the UE to report time and frequency offset information back to the HeNB. The requested time and frequency offset information provides the HeNB with the time and frequency offsets with one or more neighboring macrocells. If the UE is configured to recognize the SYNCH Request Capabilities IE 602, the UE responses with a SYNCH Provide Capabilities IE 604 to the HeNB to indicate its capability of performing the requested measurements. Legacy UEs will ignore the SYNCH Request Capabilities IE 602.

If the UE is capable of performing time and frequency offset measurements, the HeNB provides SYNCH Assistance Data 606 to the UE. In aspects of the disclosure, the SYNCH Assistance Data may contain information about target cell parameters including cell ID and frequency, and may additionally contain information about reference signal configuration, etc. There are five types of downlink reference signals in LTE: cell-specific reference signals (CRS), Multicast-Broadcast Single Frequency Network reference signals (MBSFN-RS), UE-specific reference signals (DM-RS), positioning reference signals (PRS), and channel state information reference signals (CSI-RS). Any reference signal that is sent by both the reference HeNB 510 and a target eNB of a macrocell can be used at the UE 550 for measuring timing offsets.

In an aspect of the disclosure, the reference cell is by default the requesting HeNB 510. The SYNCH Assistance Data 606 may identify one or more specific target neighbor cells (e.g., cells 302 of FIG. 3) for measurements. If a specific target cell is identified, then the HeNB may decide and indicate whether inter- or intra-frequency measurements are required. In an aspect of the disclosure, the HeNB may communicate the carrier frequency of the reference signal(s) to be measured to the UE via RRC messages.

The UE receives the SYNCH Assistance Data 606 and determines whether intra- or inter-frequency measurements are requested. The call flow illustrated in FIG. 6 is an example of intra-frequency measurements 608. Then, the HeNB transmits a SYNCH Request Information IE 610 to the UE to request time (and possibly frequency) offset information from the UE. In a step 612, the UE performs intra-frequency measurements (e.g., OTDOA measurements) on a reference signal transmitted by both the HeNB and one or more target eNBs of neighboring macrocells to determine the time offset between the eNBs. In a step 614, the UE may calculate the frequency offset from the time domain measurements. For example, the UE may estimate the frequency offset by comparing the phase between the measured reference signals from the HeNB and the neighbor eNBs. Subsequently, the UE transmits a SYNCH Provide Information IE 616 to the HeNB with the requested specific offset values (e.g., time and frequency offsets). With the offset values, the HeNB may synchronize its local clock with the neighboring eNBs.

Figure 7:
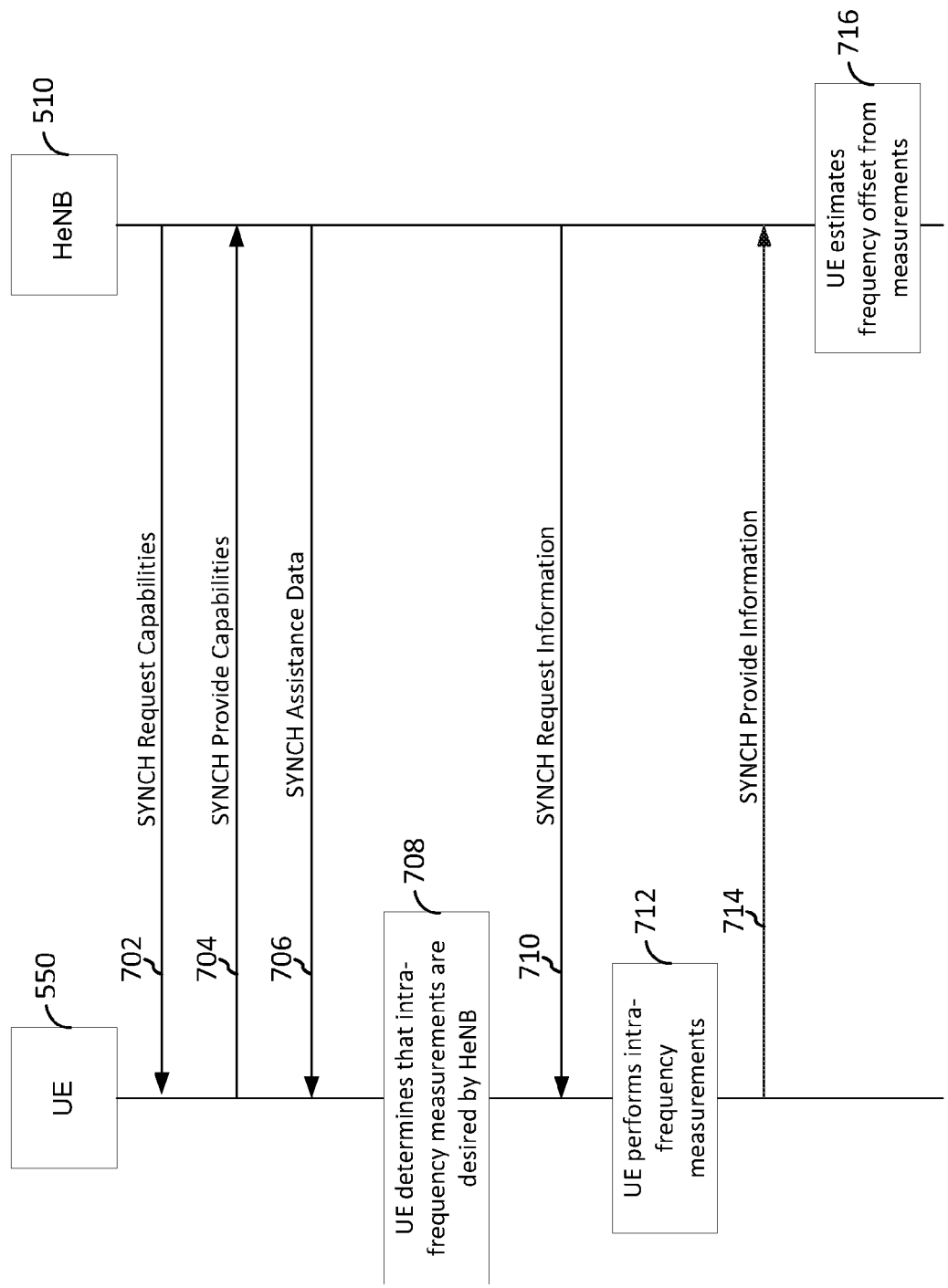
FIG. 7 is a call flow diagram illustrating time and frequency synchronization of a HeNB utilizing intra-frequency UE measurements in accordance with another aspect of the disclosure.

FIG. 7 is a call flow diagram illustrating time and frequency synchronization of a HeNB utilizing intra-frequency UE measurements in accordance with another aspect of the disclosure. In this variant, the frequency offset is calculated at the HeNB side. A HeNB 510 sends a synchronization (SYNCH) Request Capabilities information element 702 to a UE 550 to request the UE to report time offset information back to the HeNB. The requested time offset information provides the HeNB with the time offsets with one or more neighboring macrocells. If the UE is configured to recognize the SYNCH Request Capabilities IE 702, the UE responses with a SYNCH Provide Capabilities IE 704 to the HeNB to indicate its capability of performing the requested measurements. Legacy UEs will ignore the SYNCH Request Capabilities IE 702.

If the UE is capable of performing the requested time offset measurements, the HeNB provides SYNCH Assistance Data 706 to the UE. In aspects of the disclosure, the SYNCH Assistance Data may contain information about target cell parameters including cell ID and frequency, and may additionally contain information about reference signal configuration, etc. Any reference signal that is sent by both the reference HeNB 510 and a target eNB of a macrocell can be used at the UE 550 for measuring timing offsets.

In an aspect of the disclosure, the reference cell is by default the requesting HeNB 510. The SYNCH Assistance Data 706 may identify one or more specific target neighbor cells (e.g., cells 302 of FIG. 3) for measurements. If a specific target cell is identified, then the HeNB will decide and indicate whether inter- or intra-frequency measurements are required. In an aspect of the disclosure, the HeNB may communicate the carrier frequency of the reference signal(s) to be measured to the UE via RRC messages.

Based on the SYNCH Assistance Data 706, the UE determines whether intra- or inter-frequency measurements are requested. The call flow illustrated in FIG. 7 is an example of intra-frequency measurements 708. Then, the HeNB transmits a SYNCH Request Information IE 710 to the UE to request time (and possibly frequency) offset information from the UE. In a step 712, the UE performs intra-frequency measurements (e.g., OTDOA measurements) on a reference signal transmitted by both the HeNB and one or more target eNBs of neighboring macrocells to determine the time offset between the eNBs. Then, the UE transmits a SYNCH Provide Information IE 714 to the HeNB with the requested specific offset values (e.g., time offsets). In a step 716, the HeNB may calculate the frequency offset from the time domain measurements. For example, the HeNB may estimate the frequency offset from multiple timing offset measurement reports received from the UE. With the offset values, the HeNB may synchronize its local clock with the neighboring eNBs.

Figure 8:
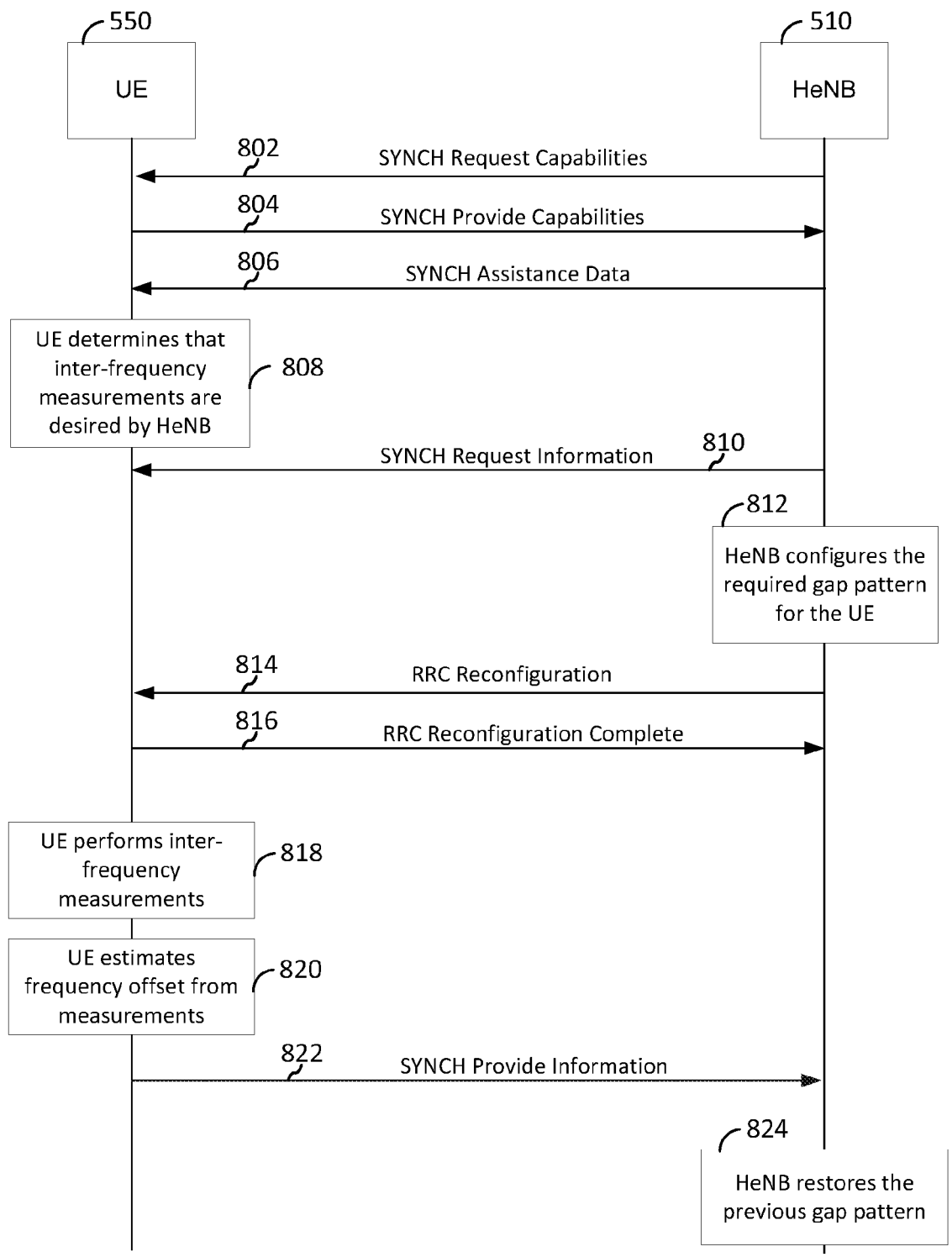
FIG. 8 is a call flow diagram illustrating time and frequency synchronization of a HeNB utilizing inter-frequency UE measurements in accordance with another aspect of the disclosure.

FIG. 8 is a call flow diagram illustrating time and frequency synchronization of a HeNB utilizing inter-frequency UE measurements in accordance with another aspect of the disclosure. A HeNB 510 sends a time and frequency synchronization (SYNCH) Request Capabilities information element 802 to a UE 550 to request the UE to report time and frequency offset information back to the HeNB. The requested measurement provides the HeNB with the time and frequency offsets with one or more neighboring macrocells. If the UE is configured to recognize the SYNCH Request Capabilities IE 802, the UE responds with a SYNCH Provide Capabilities IE 804 to the HeNB to indicate its capability of performing the requested measurements. Legacy UEs will ignore the SYNCH Request Capabilities IE 802.

If the UE is capable of performing the requested time and frequency offset measurements, the HeNB provides SYNCH Assistance Data 806 (synchronization assistance data) to the UE. In aspects of the disclosure, the SYNCH Assistance Data may contain information about target cell parameters including cell ID, frequency, and bandwidth, and may additionally contain information about reference signal configuration, etc. Any reference signal that is sent by both the reference HeNB 510 and a target eNB of a macrocell can be used at the UE 550 for measuring timing offsets.

In an aspect of the disclosure, the reference cell is by default the requesting HeNB 510. The SYNCH Assistance Data 806 may identify one or more specific target neighbor cells (e.g., cells 302 of FIG. 3) for measurements. If a specific target cell is identified, then the HeNB may decide and indicate whether inter- or intra-frequency measurements are required. In an aspect of the disclosure, the HeNB may communicate the carrier frequency of the reference signal(s) to be measured to the UE via RRC messages.

The UE receives the SYNCH Assistance Data 806 and determines whether intra- or inter-frequency measurements are requested. The call flow illustrated in FIG. 8 is an example of inter-frequency measurements. In a step 808, the UE realizes from the provided assistance data IE 806 that inter-frequency measurements are desired, and ascertains whether or not suitable measurement gaps are configured. The UE advertises its capability to the HeNB regarding whether it needs transmission gaps for making measurements on another frequency (different form serving frequency). Therefore, the HeNB knows whether or not the UE needs measurement gaps. This is done at the establishment of the RRC connection. If no measurement gaps are configured or the configured measurement gaps are not sufficient, the HeNB needs to configure the needed gap patterns for the UE.

Then, the HeNB transmits a SYNCH Request Information IE 810 to the UE to request time (and possibly frequency) offset information from the UE. In a step 812, the HeNB configures the required measurement gap patterns, and sends the gap patterns to the UE via an RRC Reconfiguration IE 814. The UE returns an RRC Reconfiguration Complete IE 816 to acknowledge that the required measurement gaps are configured.

In a step 818, the UE performs inter-frequency measurements (e.g., OTDOA measurements) on a reference signal transmitted by both the HeNB and one or more target eNBs of neighboring macrocells to determine the time offset between the eNBs. In a step 820, the UE may calculate the frequency offset from the time domain measurements. For example, the UE may estimate the frequency offset by comparing the phase between the measured reference signals from the HeNB and the neighbor eNBs. Subsequently, the UE transmits a SYNCH Provide Information IE 822 to the HeNB with the requested offset values (e.g., time and frequency offsets). With the offset values, the HeNB may synchronize its local clock with the neighboring eNBs. In a step 824, the HeNB may restore the previous gap pattern, if needed, that is used before the step 812.

Figure 9:
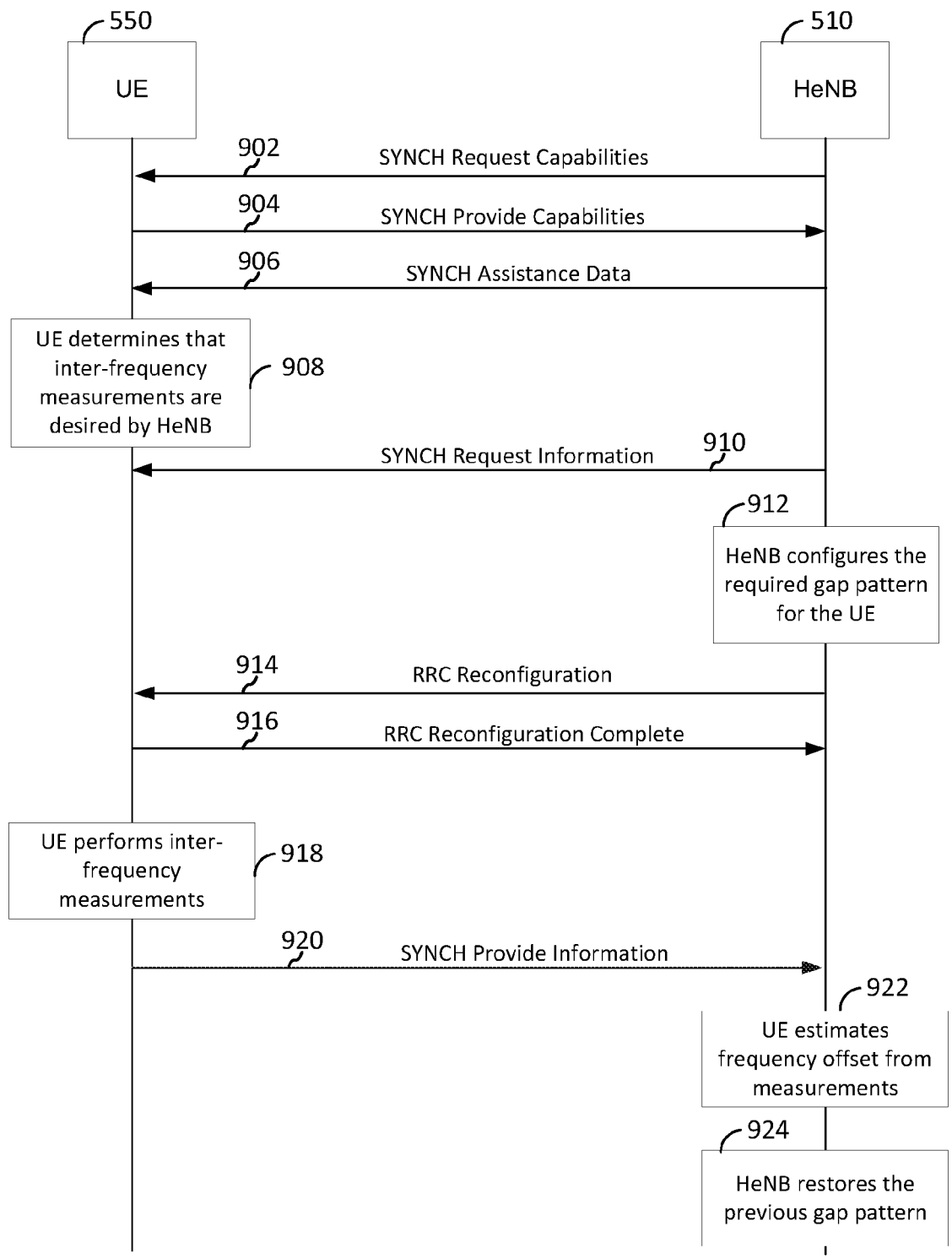
FIG. 9 is a call flow diagram illustrating time and frequency synchronization of a HeNB utilizing inter-frequency UE measurements in accordance with another aspect of the disclosure.

FIG. 9 is a call flow diagram illustrating time and frequency synchronization of a HeNB utilizing inter-frequency UE measurements in accordance with another aspect of the disclosure. A HeNB 510 sends a synchronization (SYNCH) Request Capabilities information element 902 to a UE 550 to request the UE to report time offset information back to the HeNB. The requested measurements provide the HeNB with the time offsets with one or more neighboring macrocells. If the UE is configured to recognize the SYNCH Request Capabilities IE 902, the UE responses with a SYNCH Provide Capabilities IE 904 to the HeNB to indicate its capability of performing the requested measurements. Legacy UEs will ignore the SYNCH Request Capabilities IE 902.

If the UE is capable of performing the requested time offset measurements, the HeNB provides SYNCH Assistance Data 906 to the UE. In aspects of the disclosure, the SYNCH Assistance Data may contain information about target cell parameters including cell ID and frequency, and may additionally contain information about reference signal configuration, etc. Any reference signal that is sent by both the reference HeNB 510 and a target eNB of a macrocell can be used at the UE 550 for measuring time offsets.

In an aspect of the disclosure, the reference cell is by default the requesting HeNB 510. The SYNCH Assistance Data 906 may identify one or more specific target neighbor cells (e.g., cells 302 of FIG. 3) for measurements. If a specific target cell is identified, then the HeNB may decide and indicate whether inter- or intra-frequency measurements are required. In an aspect of the disclosure, the HeNB may communicate the carrier frequency of the reference signal(s) to be measured to the UE via RRC messages.

The UE receives the SYNCH Assistance Data 906 and determines whether intra- or inter-frequency measurements are requested. The call flow illustrated in FIG. 9 is an example of inter-frequency measurements. In a step 908, the UE realizes from the provided assistance data IE 906 that inter-frequency measurements are desired, and ascertains whether or not suitable measurement gaps are configured. The UE advertises its capability to the HeNB regarding whether it needs transmission gaps for making measurements on another frequency (different form serving frequency). Therefore, the HeNB knows whether or not the UE needs measurement gaps. This is done at the establishment of the RRC connection. If no measurement gaps are configured or the configured measurement gaps are not sufficient, the HeNB will configure the needed measurement gap patterns for the UE. In some examples, if connected mode DRX (discontinuous reception) is configured, the UE may use the off times to make the measurements.

Then, the HeNB transmits a SYNCH Request Information IE 910 to the UE to request time offset information from the UE. In a step 912, the HeNB configures the required measurement gap patterns, and sends the gap patterns to the UE via an RRC Reconfiguration IE 914. The UE returns an RRC Reconfiguration Complete IE 916 to acknowledge that the required measurement gaps are configured.

In a step 918, the UE performs inter-frequency measurements (e.g., OTDOA measurements) on a reference signal transmitted by both the HeNB and one or more target eNBs of neighboring macrocells to determine the time offset between the eNBs. Subsequently, the UE transmits a SYNCH Provide Information IE 920 to the HeNB with the requested offset values (e.g., time offsets). In a step 922, the UE may calculate the frequency offset from the time domain measurements. For example, the UE may estimate the frequency offset by comparing the phase between the measured reference signals from the HeNB and the neighbor eNBs. With the offset values, the HeNB may synchronize its local clock with the neighboring eNBs.

The above-described UE-assisted time and frequency offset measurements are different from legacy RSTD measurements in various aspects. It should be noted that legacy RSTD reporting involves the LTE Positioning Protocol (LPP) and Location Server. However, no LLP or Location Server is utilized in the various aspects of the present disclosure. Also, the present UE-assisted measurement technique only uses RRC signaling for inter-frequency measurements, as there may be a need for configuring measurement gaps. The intra-frequency measurement examples do not utilize RRC signaling in the present disclosure.

In legacy systems, the UE is required to send an indication to the network (e.g., the information element—Inter-FreqRSTDMeasurementIndication) to indicate a start/stop of inter-frequency RSTD measurements as measurement gaps are needed. In the various aspects of this disclosure, the HeNB will trigger the UE via a new signaling mechanism for sending a similar indication. In legacy systems, RSTD results are reported back to a Location Server, where position calculation is done. In the various aspects of this disclosure, a new signaling mechanism is used to report the offset measurement results to the HeNB, instead of the Location Server of LLP.

Referring to FIG. 1 and FIG. 5, in one aspect of the disclosure, the apparatus 100 for wireless communication includes means for transmitting a synchronization capability request (e.g., IEs 602, 702, 802, and 902) to a UE 550 associated with the apparatus (e.g., network node such as a HeNB 510); means for receiving a synchronization capability response (e.g., IEs 602, 704, 804, and 904) as a response of the synchronization capability request from the UE; means for receiving synchronization information (e.g., IEs 616, 714, 822, and 920) of at least one target cell (e.g., cells 302) from the UE; and means for synchronizing time and frequency of the apparatus 100 with that of the at least one target cell based on the received synchronization information.

The aforementioned means may be the processing system 114 configured to perform the functions recited by the aforementioned means. As described above, the processing system 114 includes the TX Processor 516, the RX Processor 570, and the controller/processor 575. As such, in one aspect of the disclosure, the aforementioned means may be the TX Processor 516, the RX Processor 570, and the controller/processor 575 configured to perform the functions recited by the aforementioned means.

In one aspect of the disclosure, the apparatus 100 for wireless communication includes means for receiving a synchronization capability request (e.g., IEs 602, 702, 802, and 902) from a HeNB 510 (e.g., a network node) serving the apparatus 100 (e.g., UE 550); means for transmitting a synchronization capability response (e.g., IEs 602, 704, 804, and 904) as a response of the synchronization capability request to the network node; means for obtaining synchronization information (e.g., IEs 616, 714, 822, and 920) of at least one target cell (e.g., cells 302); and means for transmitting the synchronization information to the network node.

The aforementioned means may be the processing system 114 configured to perform the functions recited by the aforementioned means. As described above, the processing system 114 includes the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

Figure 10:
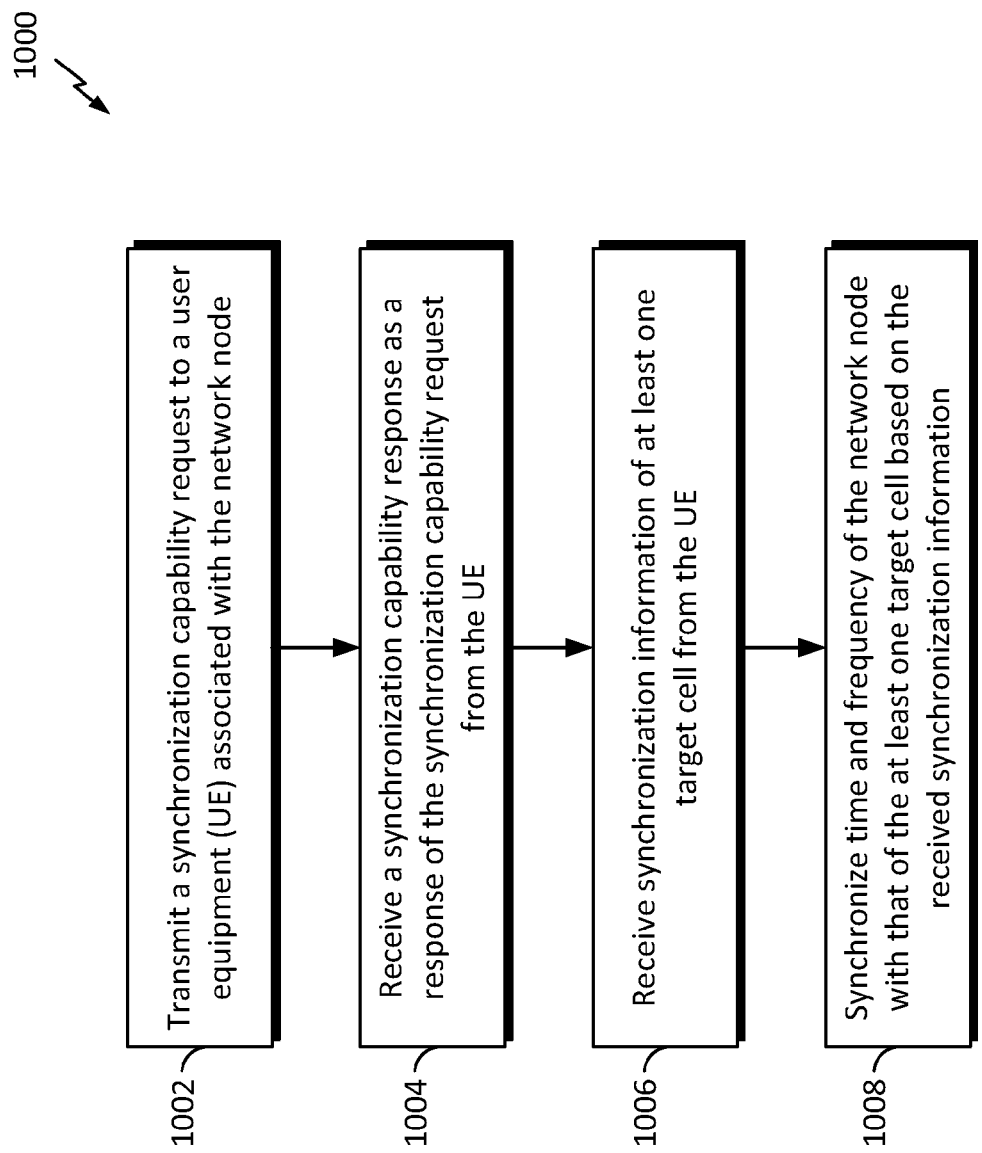
FIG. 10 is a flow chart illustrating a method of operating a HeNB to perform UE-assisted time and frequency synchronization in accordance with an aspect of the disclosure.

FIG. 10 is a flow chart illustrating a method 1000 of operating a HeNB 510 to perform UE-assisted time and frequency synchronization in accordance with an aspect of the disclosure. In step 1002, the HeNB 510 (a network node) transmits a synchronization capability request (e.g., IEs 602, 702, 802, and 902) to a UE 550 associated with the HeNB 510. In step 1004, the HeNB 510 receives a synchronization capability response (e.g., IEs 604, 704, 804, and 904) as a response of the synchronization capability request from the UE 550. A legacy UE will ignore the synchronization capability request. In step 1006, the HeNB 510 receives synchronization information of at least one target cell from the UE 550. In step 1008, the HeNB 510 synchronizes its time and frequency with that of the at least one target cell based on the received synchronization information.

Figure 11:
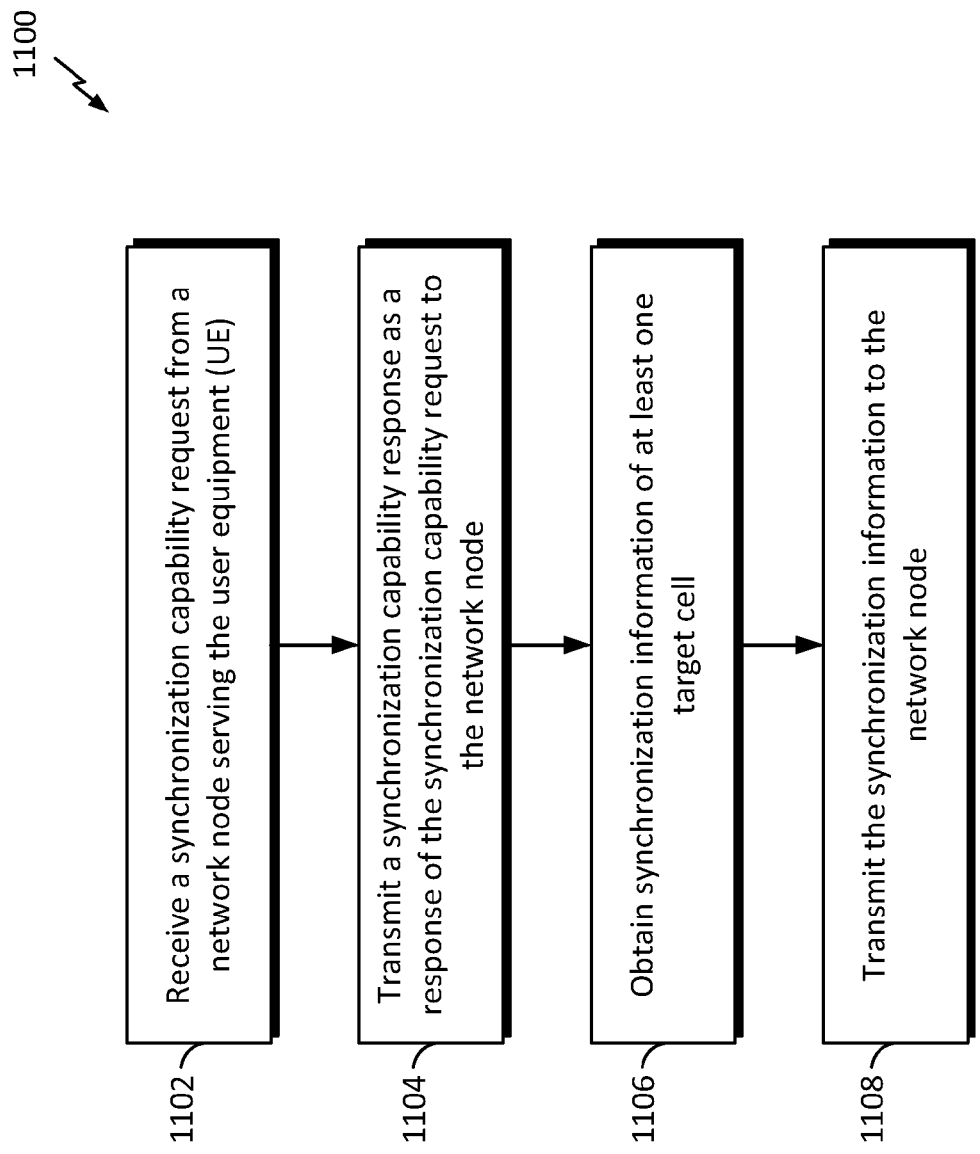
FIG. 11 is a flow chart illustrating a method of operating a UE to perform UE-assisted time and frequency synchronization of a HeNB in accordance with an aspect of the disclosure.

FIG. 11 is a flow chart illustrating a method 1100 of operating a UE 550 to perform UE-assisted time and frequency synchronization of a HeNB 510 in accordance with an aspect of the disclosure. In step 1102, the UE receives a synchronization capability request (e.g., IEs 602, 702, 802, and 902) from a HeNB (network node) serving the UE. In step 1104, the UE transmits a synchronization capability response (e.g., IEs 604, 704, 804, and 904) as a response of the synchronization capability request to the HeNB. In step 1106, the UE obtains synchronization information (e.g., time and/or frequency offsets) of at least one target cell. In step 1108, the UE transmits the synchronization information to the HeNB.

Figure 12:
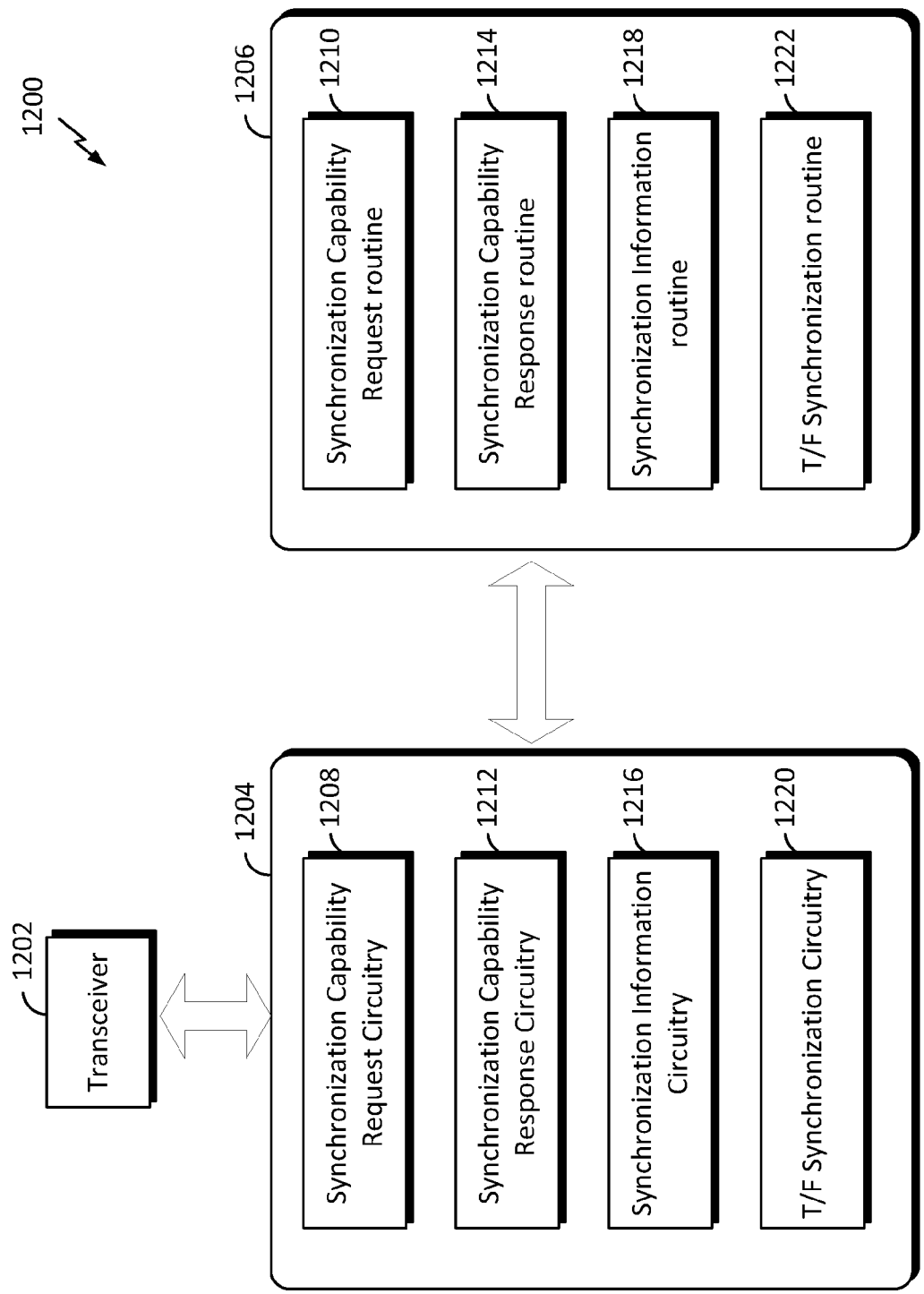
FIG. 12 is a conceptual block diagram illustrating a network node capable of time and frequency synchronization utilizing UE measurements in accordance with an aspect of the disclosure.

FIG. 12 is a conceptual block diagram illustrating a network node 1200 capable of time and frequency synchronization utilizing UE measurements in accordance with an aspect of the disclosure. The network node 1200 may be the network node 510. Some components of the network node 1200 include a transceiver 1202, at least one processor 1204, and a computer readable medium 1206. The transceiver 1202 may be utilized to communicate with a UE. Generally known components of a network node and not necessary for understanding the invention are not shown in FIG. 12. In an aspect of the disclosure, the network node 1200 may be implemented with the apparatus 100. Therefore, the transceiver 1202, the processor 1204, and the computer readable medium 1206 may correspond to the elements 110, 104, and 106 of FIG. 1, respectively. The processor 1204 may be configured by the software on the computer readable medium 1206 to perform various functionalities described in reference to FIGS. 6-11.

A synchronization capability request circuitry 1208 when configured by a synchronization capability request routine 1210, may transmit a synchronization capability request (e.g., SYNCH Request Capabilities 602, 702, 802, 902) to a UE (e.g., a UE 550) associated with the network node. A synchronization capability response circuitry 1212 when configured by a synchronization capability response routine 1214, may receive a synchronization capability response (e.g., SYNCH Provide Capabilities 604, 704, 804, 904) from the UE as a response to the synchronization capability request. A synchronization information circuitry 1216 when configured by a synchronization information routine 1218, may receive synchronization information (e.g., SYNCH Provide Information 616, 714, 822, 920) of at least one target cell from the UE. A time and frequency (T/F) synchronization circuitry 1220 when configured by a T/F synchronization routine 1222, may synchronize time and frequency of the network node with that of the at least one target cell based on the received synchronization information.

Figure 13:
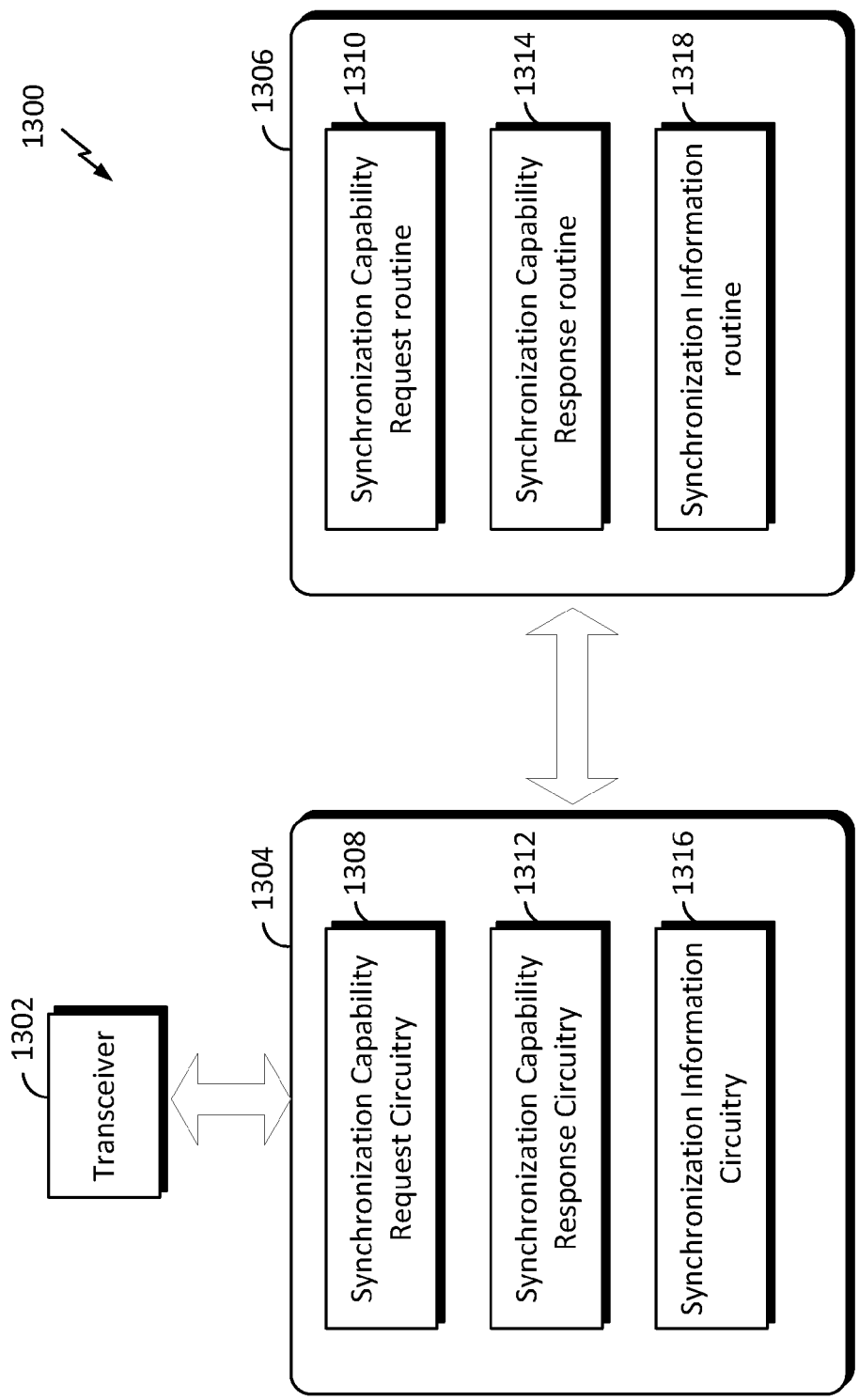
FIG. 13 is a conceptual block diagram illustrating a UE capable of supporting time and frequency synchronization of a network node utilizing UE measurements in accordance with an aspect of the disclosure.

FIG. 13 is a conceptual block diagram illustrating a UE 1300 capable of supporting time and frequency synchronization of a network node utilizing UE measurements in accordance with an aspect of the disclosure. The UE 1300 may be the UE 550. Some components of the UE 1300 include a transceiver 1302, at least one processor 1304, and a computer readable medium 1306. Generally known components of a UE and not necessary for understanding the invention are not shown in FIG. 13. In an aspect of the disclosure, the UE 1300 may be implemented with the apparatus 100. Therefore, the transceiver 1302, the processor 1304, and the computer readable medium 1306 may correspond to the elements 110, 104, and 106 of FIG. 1, respectively. The processor 1304 may be configured by the software on the computer readable medium 1306 to perform various functionalities described in reference to FIGS. 6-11.

A synchronization capability request circuitry 1308 when configured by a synchronization capability request routine 1310, may receive a synchronization capability request (e.g., SYNCH Request Capabilities 602, 702, 802, 902) from a network node serving the UE 1300. A synchronization capability response circuitry 1312 when configured by a synchronization capability response routine 1314, may transmit a synchronization capability response (e.g., SYNCH Provide Capabilities 604, 704, 804, 904) to the network node as a response to the synchronization capability request. A synchronization information circuitry 1316 when configured by a synchronization information routine 1318, may obtain synchronization information of at least one target cell and transmit the synchronization information (e.g., SYNCH Provide Information 616, 714, 822, 920) to the network node.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications operable at a network node, comprising:
   transmitting a synchronization capability request to a user equipment (UE) associated with the network node, the synchronization capability request requesting the UE to report synchronization information of at least one target cell;
   receiving a synchronization capability response from the UE as a response to the synchronization capability request, the synchronization capability response indicating the capability of the UE to perform measurements associated with the synchronization information;
   transmitting synchronization assistance data to the UE;
   transmitting a synchronization information request to the UE to obtain the synchronization information;
   receiving the synchronization information of the at least one target cell from the UE; and
   synchronizing time and frequency of the network node with that of the at least one target cell based on the received synchronization information.

2. The method of claim 1, wherein the network node comprises a femtocell, a small cell, a low-power cell, a picocell, or a metrocell, and the at least one target cell comprises a macrocell.

3. The method of claim 1,
   wherein the synchronization assistance data comprises at least one of identification, frequency, and bandwidth information of the at least one target cell, or a reference signal configuration of the at least one target cell.

4. The method of claim 1, wherein the synchronization information comprises an inter-frequency or intra-frequency measurement.

5. The method of claim 1, wherein the synchronization information comprises a time offset between a first reference signal of the at least one target cell and a second reference signal of the network node.

6. The method of claim 5, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

7. The method of claim 5, wherein the synchronization information further comprises a frequency offset between the first reference signal and the second reference signal.

8. The method of claim 1, wherein synchronizing the time and frequency comprises determining a frequency offset between a first reference signal of the at least one target cell and a second reference signal of the network node, based on the synchronization information.

9. The method of claim 8, wherein the frequency offset is computed at the UE or the network node.

10. A method of wireless communications operable at a user equipment (UE), comprising:
   receiving a synchronization capability request from a network node serving the UE, the synchronization capability request requesting the UE to report synchronization information of at least one target cell;
   transmitting a synchronization capability response to the network node as a response to the synchronization capability request, the synchronization capability response indicating the capability of the UE to perform measurements associated with the synchronization information;
   receiving synchronization assistance data from the network node;

receiving a synchronization information request from the network node to obtain the synchronization information;

obtaining the synchronization information of the at least one target cell based on the synchronization assistance data; and transmitting the synchronization information to the network node.

11. The method of claim 10,
wherein the synchronization assistance data comprises at least one of identification, frequency, and bandwidth information of the at least one target cell, or a reference signal configuration of the at least one target cell.

12. The method of claim 10, wherein the synchronization information comprises an inter-frequency or intra-frequency measurement.

13. The method of claim 10, wherein the synchronization information comprises a time offset between a first reference signal of the at least one target cell and a second reference signal of the network node.

14. The method of claim 13, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

15. The method of claim 13, wherein the synchronization information further comprises a frequency offset between the first reference signal and the second reference signal.

16. The method of claim 15, further comprising determining the frequency offset based on a plurality of time offsets between the first reference signal and the second reference signal.

17. The method of claim 10, wherein obtaining the synchronization information comprises:
receiving a first reference signal from the at least one target cell and a second reference signal from the network node; and
determining a timing difference between the first reference signal and the second reference signal.

18. A network node, comprising:
means for transmitting a synchronization capability request to a user equipment (UE) associated with the network node, the synchronization capability request requesting the UE to report synchronization information of at least one target cell;
means for receiving a synchronization capability response from the UE as a response to the synchronization capability request, the synchronization capability response indicating the capability of the UE to perform measurements associated with the synchronization information;
means for transmitting synchronization assistance data to the UE;
means for transmitting a synchronization information request to the UE to obtain the synchronization information;
means for receiving the synchronization information of the at least one target cell from the UE; and
means for synchronizing time and frequency of the network node with that of the at least one target cell based on the received synchronization information.

19. The network node of claim 18, wherein the network node comprises a femtocell, a small cell, a low-power cell, a picocell, or a metrocell, and the at least one target cell comprises a macrocell.

20. The network node of claim 18,
wherein the synchronization assistance data comprises at least one of identification, frequency, and bandwidth information of the at least one target cell, or a reference signal configuration of the at least one target cell.

21. The network node of claim 18, wherein the synchronization information comprises an inter-frequency or intra-frequency measurement.

22. The network node of claim 18, wherein the synchronization information comprises a time offset between a first reference signal of the at least one target cell and a second reference signal of the network node.

23. The network node of claim 22, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

24. The network node of claim 22, wherein the synchronization information further comprises a frequency offset between the first reference signal and the second reference signal.

25. The network node of claim 18, wherein the means for synchronizing the time and frequency comprises means for determining a frequency offset between a first reference signal of the at least one target cell and a second reference signal of the network node, based on the synchronization information.

26. The network node of claim 25, wherein the frequency offset is computed at the UE or the network node.

27. A user equipment (UE), comprising:
means for receiving a synchronization capability request from a network node serving the UE, the synchronization capability request requesting the UE to report synchronization information of at least one target cell;
means for transmitting a synchronization capability response to the network node as a response to the synchronization capability request, the synchronization capability response indicating the capability of the UE to perform measurements associated with the synchronization information;
means for receiving synchronization assistance data from the network node;
means for receiving a synchronization information request from the network node to obtain the synchronization information;
means for obtaining the synchronization information of the at least one target cell based on synchronization assistance data; and
means for transmitting the synchronization information to the network node.

28. The UE of claim 27,
wherein the synchronization assistance data comprises at least one of identification, frequency, and bandwidth information of the at least one target cell, or a reference signal configuration of the at least one target cell.

29. The UE of claim 27, wherein the synchronization information comprises an inter-frequency or intra-frequency measurement.

30. The UE of claim 27, wherein the synchronization information comprises a time offset between a first reference signal of the at least one target cell and a second reference signal of the network node.

31. The UE of claim 30, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

32. The UE of claim 30, wherein the synchronization information further comprises a frequency offset between the first reference signal and the second reference signal.

33. The UE of claim 32, further comprising means for determining the frequency offset based on a plurality of time offsets between the first reference signal and the second reference signal.

34. The UE of claim 27, wherein the means for obtaining the synchronization information comprises:
means for receiving a first reference signal from the at least one target cell and a second reference signal from the network node; and
means for determining a timing difference between the first reference signal and the second reference signal.

35. A computer program product, comprising:
a non-transitory computer-readable storage medium comprising code for causing a network node to:
transmit a synchronization capability request to a user equipment (UE) associated with the network node, the synchronization capability request requesting the UE to report synchronization information of at least one target cell;
receive a synchronization capability response from the UE as a response to the synchronization capability request, the synchronization capability response indicating the capability of the UE to perform measurements associated with the synchronization information;
transmit synchronization assistance data to the UE;
transmit a synchronization information request to the UE to obtain the synchronization information;
receive the synchronization information of the at least one target cell from the UE; and
synchronize time and frequency of the network node with that of the at least one target cell based on the received synchronization information.

36. The computer program product of claim 35, wherein the network node comprises a femtocell, a small cell, a low-power cell, a picocell, or a metrocell, and the at least one target cell comprises a macrocell.

37. The computer program product of claim 35,
wherein the synchronization assistance data comprises at least one of identification, frequency, and bandwidth information of the at least one target cell, or a reference signal configuration of the at least one target cell.

38. The computer program product of claim 35, wherein the synchronization information comprises an inter-frequency or intra-frequency measurement.

39. The computer program product of claim 35, wherein the synchronization information comprises a time offset between a first reference signal of the at least one target cell and a second reference signal of the network node.

40. The computer program product of claim 39, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

41. The computer program product of claim 39, wherein the synchronization information further comprises a frequency offset between the first reference signal and the second reference signal.

42. The computer program product of claim 35, wherein the code for synchronizing the time and frequency further comprises code for causing the network node to determine a frequency offset between a first reference signal of the at least one target cell and a second reference signal of the network node, based on the synchronization information.

43. The computer program product of claim 42, wherein the frequency offset is computed at the UE or the network node.

44. A computer program product, comprising:
a non-transitory computer-readable storage medium comprising code for causing a user equipment (UE) to:
receive a synchronization capability request from a network node serving the UE, the synchronization capability request requesting the UE to report synchronization information of at least one target cell;
transmit a synchronization capability response to the network node as a response to the synchronization capability request, the synchronization capability response indicating the capability of the UE to perform measurements associated with the synchronization information;
receive synchronization assistance data from the network node;
receive a synchronization information request from the network node to obtain the synchronization information;
obtain the synchronization information of the at least one target cell based on the synchronization assistance data; and
transmit the synchronization information to the network node.

45. The computer program product of claim 44,
wherein the synchronization assistance data comprises at least one of identification, frequency, and bandwidth information of the at least one target cell, or a reference signal configuration of the at least one target cell.

46. The computer program product of claim 44, wherein the synchronization information comprises an inter-frequency or intra-frequency measurement.

47. The computer program product of claim 44, wherein the synchronization information comprises a time offset between a first reference signal of the at least one target cell and a second reference signal of the network node.

48. The computer program product of claim 47, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

49. The computer program product of claim 47, wherein the synchronization information further comprises a frequency offset between the first reference signal and the second reference signal.

50. The computer program product of claim 49, further comprising code for causing the UE to determine the frequency offset based on a plurality of time offsets between the first reference signal and the second reference signal.

51. The computer program product of claim 44, wherein the code for obtaining the synchronization information comprises code for causing the UE to:
receive a first reference signal from the at least one target cell and a second reference signal from the network node; and
determine a timing difference between the first reference signal and the second reference signal.

52. A network node comprising:
  at least one processor;
  a communication interface coupled to the at least one processor; and
  a memory coupled to the at least one processor,
  wherein the at least one processor is configured to:
    transmit a synchronization capability request to a user equipment (UE) associated with the network node, the synchronization capability request requesting the UE to report synchronization information of at least one target cell;
    receive a synchronization capability response from the UE as a response to the synchronization capability request, the synchronization capability response indicating the capability of the UE to perform measurements associated with the synchronization information;
    transmit synchronization assistance data to the UE;
    transmit a synchronization information request to the UE to obtain the synchronization information;
    receive the synchronization information of the at least one target cell from the UE; and
    synchronize time and frequency of the network node with that of the at least one target cell based on the received synchronization information.

53. The network node of claim 52, wherein the network node comprises a femtocell, a small cell, a low-power cell, a picocell, or a metrocell, and the at least one target cell comprises a macrocell.

54. The network node of claim 52,
  wherein the synchronization assistance data comprises at least one of identification, frequency, and bandwidth information of the at least one target cell, or a reference signal configuration of the at least one target cell.

55. The network node of claim 52, wherein the synchronization information comprises an inter-frequency or intra-frequency measurement.

56. The network node of claim 52, wherein the synchronization information comprises a time offset between a first reference signal of the at least one target cell and a second reference signal of the network node.

57. The network node of claim 56, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

58. The network node of claim 56, wherein the synchronization information further comprises a frequency offset between the first reference signal and the second reference signal.

59. The network node of claim 52, wherein for synchronizing the time and frequency, the at least one processor is further configured to determine a frequency offset between a first reference signal of the at least one target cell and a second reference signal of the network node, based on the synchronization information.

60. The network node of claim 59, wherein the frequency offset is computed at the UE or the network node.

61. A user equipment (UE) comprising:
  at least one processor;
  a communication interface coupled to the at least one processor; and
  a memory coupled to the at least one processor,
  wherein the at least one processor is configured to:
    receive a synchronization capability request from a network node serving the UE, the synchronization capability request requesting the UE to report synchronization information of at least one target cell;
    transmit a synchronization capability response to the network node as a response to the synchronization capability request, the synchronization capability response indicating the capability of the UE to perform measurements associated with the synchronization information;
    receive synchronization assistance data from the network node;
    receive a synchronization information request from the network node to obtain the synchronization information;
    obtain the synchronization information of the at least one target cell based on the synchronization assistance data; and
    transmit the synchronization information to the network node.

62. The UE of claim 61,
  wherein the synchronization assistance data comprises at least one of identification, frequency, and bandwidth information of the at least one target cell, or a reference signal configuration of the at least one target cell.

63. The UE of claim 61, wherein the synchronization information comprises an inter-frequency or intra-frequency measurement.

64. The UE of claim 61, wherein the synchronization information comprises a time offset between a first reference signal of the at least one target cell and a second reference signal of the network node.

65. The UE of claim 64, wherein the first reference signal comprises at least one of a cell-specific reference signal (CRS), a multicast-broadcast single frequency network reference signal (MBSFN-RS), a UE-specific reference signal (DM-RS), a positioning reference signal (PRS), or a channel state information reference signal (CSI-RS).

66. The UE of claim 64, wherein the synchronization information further comprises a frequency offset between the first reference signal and the second reference signal.

67. The UE of claim 66, wherein the at least one processor is further configured to:
  determine the frequency offset based on a plurality of time offsets between the first reference signal and the second reference signal.

68. The UE of claim 61, wherein for obtaining the synchronization information, the at least one processor is further configured to:
  receive a first reference signal from the at least one target cell and a second reference signal from the network node; and
  determine a timing difference between the first reference signal and the second reference signal.

* * * * *